(12) United States Patent
Gustav et al.

(10) Patent No.: US 10,123,550 B2
(45) Date of Patent: Nov. 13, 2018

(54) METHOD FOR MANUFACTURING CONFECTIONERY SHELLS

(75) Inventors: Thorsten Gustav, Solihull West Midlands (GB); Paula Mora Castrillon, Munich (DE)

(73) Assignee: Kraft Foods R&D, Inc., Deerfield, IL (US)

( * ) Notice: Subject to any disclaimer, the term of this patent is extended or adjusted under 35 U.S.C. 154(b) by 914 days.

(21) Appl. No.: 14/131,193

(22) PCT Filed: Jul. 2, 2012

(86) PCT No.: PCT/US2012/045219
§ 371 (c)(1),
(2), (4) Date: Apr. 7, 2014

(87) PCT Pub. No.: WO2013/006541
PCT Pub. Date: Jan. 10, 2013

(65) Prior Publication Data
US 2014/0287102 A1   Sep. 25, 2014

(30) Foreign Application Priority Data

Jul. 6, 2011   (EP) .................................... 11172833

(51) Int. Cl.
*A23G 3/54*    (2006.01)
*A23G 1/00*    (2006.01)
(Continued)

(52) U.S. Cl.
CPC ........... *A23G 3/545* (2013.01); *A23G 1/0053* (2013.01); *A23G 1/0069* (2013.01);
(Continued)

(58) Field of Classification Search
CPC ........ A23G 3/54; A23G 4/20; A23G 2220/20; A23G 1/0076; A23G 4/10; A23G 3/545;
(Continued)

(56) References Cited

U.S. PATENT DOCUMENTS 1,647,944 A   11/1927   Villasenor
1,775,549 A    9/1930   Birdseye
(Continued)

FOREIGN PATENT DOCUMENTS

AU    199957075    5/2000
BE    1017445      9/2008
(Continued)

OTHER PUBLICATIONS

Australian Patent Office, Office Action dated Jul. 2, 2014, from Australian Patent Application No. 2012279251, 3 pages.
(Continued)

*Primary Examiner* — Jyoti Chawla
(74) *Attorney, Agent, or Firm* — Fitch, Even, Tabin & Flannery LLP

(57) ABSTRACT

A method of producing a multi-layered confectionery shell and a method of producing a plurality of confectionery shells are provided. The distance the stamp is pressed into the mold cavity in a second phase is shorter than the distance the stamp is pressed into the mold cavity in a first phase.

18 Claims, 3 Drawing Sheets

(51) Int. Cl.
*A23G 1/54* (2006.01)
*A23G 3/34* (2006.01)

(52) U.S. Cl.
CPC ............ *A23G 1/0076* (2013.01); *A23G 1/54* (2013.01); *A23G 1/545* (2013.01); *A23G 3/004* (2013.01); *A23G 3/008* (2013.01); *A23G 3/0029* (2013.01); *A23G 3/0074* (2013.01)

(58) Field of Classification Search
CPC ...... A23G 3/0029; A23G 3/0065; A23G 1/36; A23G 3/0068; A23G 3/008; A23G 1/30; A23G 1/00; A23G 2200/12; A23G 3/0252
USPC ................................ 426/103, 138, 302, 660
See application file for complete search history.

(56) References Cited

U.S. PATENT DOCUMENTS

| | | | |
|---|---|---|---|
| 2,671,417 A | 3/1954 | Jacobsen | |
| 2,796,033 A | 6/1957 | Feinstein | |
| 3,027,728 A | 4/1962 | Greer | |
| 3,233,562 A | 2/1966 | Nakamura | |
| 3,798,337 A | 3/1974 | Abalo | |
| 4,104,411 A | 8/1978 | Pooler | |
| 4,501,544 A * | 2/1985 | Akutagawa | A23G 1/205 425/218 |
| 5,238,698 A | 8/1993 | Zumbe et al. | |
| 5,360,116 A | 11/1994 | Schmiletzky | |
| 5,360,166 A | 11/1994 | Nogi | |
| 5,500,178 A | 3/1996 | Hayashi | |
| 5,705,217 A | 1/1998 | Aasted | |
| 5,789,005 A | 8/1998 | Tabaroni | |
| 5,832,697 A | 11/1998 | Rogers | |
| 6,165,531 A * | 12/2000 | Harding | A23G 1/226 426/512 |
| 6,180,158 B1 | 1/2001 | Zietlow | |
| 6,217,927 B1 | 4/2001 | Suttle | |
| 6,242,028 B1 | 6/2001 | Bean | |
| 6,406,732 B1 | 6/2002 | Lee | |
| 6,419,970 B1 | 7/2002 | Willcocks | |
| 2003/0090026 A1 | 5/2003 | Rasmussen | |
| 2004/0131751 A1 | 7/2004 | Dekker | |
| 2005/0175737 A1 | 8/2005 | Knobel | |
| 2006/0057265 A1 | 3/2006 | Knobel | |
| 2006/0257517 A1 | 11/2006 | Steiner | |
| 2009/0274803 A1 | 11/2009 | Descamps | |
| 2012/0183650 A1 | 7/2012 | Liske | |
| 2014/0220229 A1 | 8/2014 | Gustav | |
| 2014/0234523 A1 | 8/2014 | Gustav | |
| 2014/0287102 A1 | 9/2014 | Gustav | |
| 2014/0328986 A1 | 11/2014 | Weers | |

FOREIGN PATENT DOCUMENTS

| | | | |
|---|---|---|---|
| BR | 9301046 | 8/1994 | |
| CH | 680411 | 8/1992 | |
| CN | 1083666 | 3/1994 | |
| CN | 1129393 | 8/1996 | |
| CN | 1431868 | 7/2003 | |
| CN | 1652691 | 8/2005 | |
| DE | 2812269 | 10/1978 | |
| DE | 142986 | 7/1980 | |
| DE | 29808288 | 9/1999 | |
| DE | 19830258 | 1/2000 | |
| DE | 19851063 | 5/2000 | |
| DE | 19853847 | 5/2000 | |
| DE | 102005018415 | 11/2006 | |
| DE | 102008019038 | * 2/2010 | ........... A23G 1/0063 |
| EP | 0230763 | 8/1987 | |
| EP | 0589820 | 3/1994 | |
| EP | 0730827 | 9/1996 | |
| EP | 0914774 | 5/1999 | |
| EP | 0945069 | 9/1999 | |
| EP | 1103467 | 5/2001 | |
| EP | 1346641 | 9/2003 | |
| EP | 1413205 | 4/2004 | |
| EP | 1509092 | 3/2005 | |
| EP | 1604573 | 12/2005 | |
| EP | 2018811 | 1/2009 | |
| EP | 2386208 | 11/2011 | |
| FR | 1587835 | 3/1970 | |
| FR | 2539670 | 7/1984 | |
| FR | 2609237 | 7/1988 | |
| FR | 2801570 | 6/2001 | |
| GB | 459583 | 1/1937 | |
| GB | 645747 | 11/1950 | |
| GB | 769092 | 2/1957 | |
| GB | 1128525 | 9/1968 | |
| GB | 1214983 | 12/1970 | |
| GB | 1305520 | 2/1973 | |
| GB | 2140737 | 12/1984 | |
| GB | 2279286 | 1/1995 | |
| GB | 2335882 A * | 10/1999 | ........... A23G 3/0263 |
| GB | 2405827 | 1/2007 | |
| JP | 55023911 | 2/1980 | |
| JP | 56023838 | 3/1981 | |
| JP | 59120062 | 7/1984 | |
| JP | 61037077 | 2/1986 | |
| JP | 2092261 | 4/1990 | |
| JP | 6303907 | 11/1994 | |
| JP | 2009136193 | 6/2009 | |
| RU | 2041640 | 8/1995 | |
| RU | 2185071 | 7/2002 | |
| RU | 2246223 | 2/2005 | |
| WO | 1993021087 | 10/1993 | |
| WO | 1994004046 | 3/1994 | |
| WO | 1995032633 | 12/1995 | |
| WO | WO 9532633 A1 * | 12/1995 | ............ A23G 1/207 |
| WO | 2001080660 | 11/2001 | |
| WO | 2003094626 | 11/2003 | |
| WO | 2003099031 | 12/2003 | |
| WO | 2004068963 | 8/2004 | |
| WO | 2006122823 | 11/2006 | |
| WO | 2009040530 | 4/2009 | |
| WO | 2012171657 | 12/2012 | |

OTHER PUBLICATIONS

Australian Patent Office, Office Action dated Jun. 3, 2014, from Australian Patent Application No. 2012279094, 5 pages.
Australian Patent Office, Office Action dated Jun. 3, 2014, from Australian Patent Application No. 2012279200, 4 pages.
Australian Patent Office, Office Action dated Jun. 4, 2014, from Australian Patent Application No. 2012279126, 4 pages.
Australian Patent Office, Office Action dated May 12, 2015, from Australian Patent Application No. 2012279126, 3 pages.
Australian Patent Office, Office Action dated May 6, 2015, from Australian Patent Application No. 2012279251, 3 pages.
Chinese Patent Office, Office Action and Search Report dated Apr. 1, 2016, from Chinese Patent Application No. 201280043422.6, 22 pages.
Chinese Patent Office, Office Action and Search Report dated Feb. 2, 2015, from Chinese Patent Application No. 201280043422.6, 26 pages.
Chinese Patent Office, Office Action and Search Report dated Feb. 5, 2015, from Chinese Patent Application No. 201280033501.9, 19 pages.
Chinese Patent Office, Office Action and Search Report dated Jan. 19, 2015, from Chinese Patent Application No. 201280043393.3, 18 pages.
Chinese Patent Office, Office Action and Search Report dated Nov. 2, 2015, from Chinese Patent Application No. 201280043422.6, 20 pages.
Chinese Patent Office, Office Action dated Dec. 16, 2015, from Chinese Patent Application No. 201280033501.9, 14 pages.
Chinese Patent Office, Office Action dated Feb. 2, 2015, from Chinese Patent Application No. 201280043380.6, 22 pages.
Chinese Patent Office, Office Action dated Jul. 5, 2016, from Chinese Patent Application No. 201280033501.9, 16 pages.

(56) References Cited

OTHER PUBLICATIONS

Chinese Patent Office, Office Action dated Oct. 23, 2015, from Chinese Patent Application No. 201280043380.6, 14 pages.
Electronics Cooling. Thermal Conductivity of Rubbers. Mar. 10, 2010, Retrieved from Internet Archive URL: <https://web.archive.org/web/20100315052438/http://www.electronics-cooling.com/2001/11/the-thermal-conductivity-of-rubbers-elastomers/>, 4 pages.
Europan Patent Office Search Report of European Applicatin No. 11172831, dated Feb. 1, 2012.
European Search Report and Written Opinion, European Application 11172832.5, dated Feb. 10, 2012, 9 pages.
European Search Report, European Patent Application No. 11172834.1, dated Feb. 16, 2012, 9 pages.
Extended European Search Report, European Application No. 11172831.7, dated Feb. 17, 2012, 11 pages.
International Search Report and Written Opinion, International Patent Application PCT/US2012/044857, dated Dec. 3, 2012, 11 pages.
International Search Report and Written Opinion, International Patent Application PCT/US2012/045196, date of completion Nov. 21, 2012, 13 pages.
International Search Report and Written Opinion, International Patent Application PCT/US2012/045219, date of completion Dec. 3, 2012, 22 pages.
International Search Report and Written Opinion, International Patent Application PCT/US2012/045360, date of completion Nov. 23, 2012, 16 pages.
Lasance, Clemens J.M. "The Thermal Conductivity of Rubbers/Elastomers." Engineering Toolbox, Feb. 4, 2009, Retrieved from Internet Archive URL: <https://web.archive.org/web/20090204033803/http://engineeringtoolbox.com/thermal-conductivity-d_429.html>, 2 pp.
New Zealand Patent Office, Office Action dated Jan. 6, 2016, from New Zealand Patent Application No. 619689, 2 pages.
New Zealand Patent Office, Office Action dated Nov. 6, 2014, from New Zealand Patent Application No. 619689, 2 pages.
New Zealand Patent Office, Office Action dated Nov. 7, 2014, from New Zealand Patent Application No. 619794, 2 pages.
New Zealand Patent Office, Office Action dated Oct. 2, 2014, from New Zealand Patent Application No. 619608, 2 pages.
New Zealand Patent Office, Office Action dated Oct. 2, 2014, from New Zealand Patent Application No. 619609, 2 pages.
Partial European Search Report, European Application 11172833.3, date of completion Mar. 2, 2012, 10 pages.
Russian Patent Office, Decision to Grant dated Jan. 25, 2017, from Russian Patent Application No. 2014103150, 14 pages.
Russian Patent Office, Office Action dated Apr. 11, 2016, from Russian Patent Application No. 2014102481, 7 pages.
Russian Patent Office, Office Action dated Apr. 11, 2016, from Russian Patent Application No. 2014102649, 7 pages.
Russian Patent Office, Office Action dated Aug. 15, 2016, from Russian Patent Application No. 2014103150, 6 pages.
Russian Patent Office, Office Action dated May 13, 2016, from Russian Patent Application No. 2014103313, 4 pages.

\* cited by examiner

Figure 5a
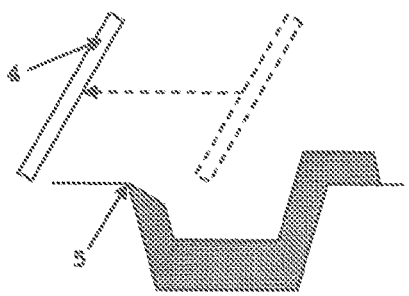
Figure 5b
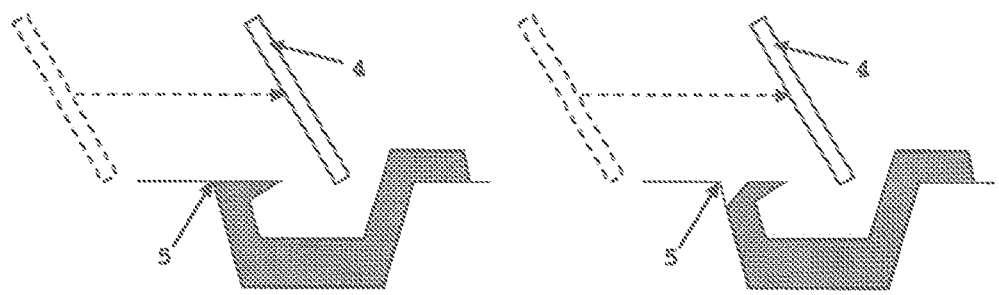
Figure 6a  Figure 6b  Figure 6c
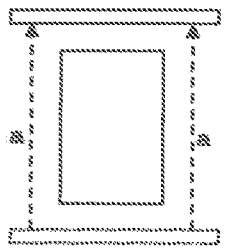 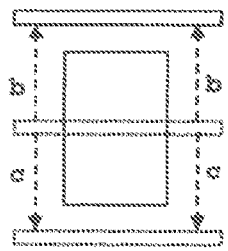 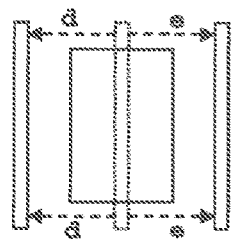
Figure 7
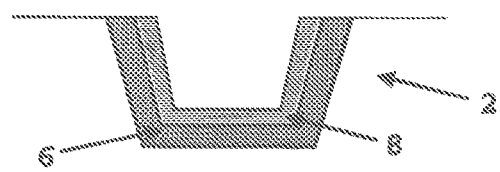

METHOD FOR MANUFACTURING CONFECTIONERY SHELLS

CROSS REFERENCE TO RELATED APPLICATIONS

This application is a U.S. national phase application of International Application No. PCT/US2012/045219, filed Jul. 2, 2012, designating the United States, which claims benefit from EP Application No. 11172833.3, filed Jul. 6, 2011, both of which are hereby incorporated herein by reference in their entirety.

TECHNICAL FIELD

The present invention relates to a method of producing a multi-layered confectionery shell which can be conducted using just one stamp. The present invention further relates to a method of producing a plurality of confectionery shells which can also be conducted using just one stamp.

BACKGROUND OF THE INVENTION

Confectionery shells provide a structurally firm outer in which confectionery fillings can be placed and are a well-known aspect of confectionery manufacture. A confectionery shell may also serve as a matrix in which pieces of edible material are dispersed. These inclusions have a different composition to that of the confectionery shell. Confectionery shells having a multi-layered structure are also known. The layers of the shell may differ in terms of their composition and/or colour.

It is known to manufacture a confectionery shell by depositing shell material into a mould cavity, vibrating the mould to remove air bubbles in the material and inverting the mould to remove excess material ("inversion method"). However, this method suffers from the disadvantage that the excess material must be collected and treated (e.g. re-tempering of chocolate) to avoid wastage. Also, the shell typically does not have a uniform thickness, especially when using a shell material having a relatively high viscosity. This imposes restrictions on the composition (e.g. fat content) of the material.

An improved method for manufacturing a confectionery shell involves immersing a chilled stamp into the shell material in a mould cavity to shape and solidify the material against the wall of the cavity ("cold-stamping"). This produces a shell having a uniform thickness and does not produce as much excess material as the inversion method. Furthermore, cold-stamping is not as dependent on the viscosity of the shell material.

For instance, US-A-2006/0057265 describes a cold-stamping process in which the substance forming the confectionery shell is placed under pressure after the stamp is introduced into the mould. The process uses a stamp having an axial bore through which pressure is exerted by means of a pressure-transmitting medium.

US-A-2006/0257517 concerns a cold-stamping process in which the stamp has a flange that covers the mould boundary. The flange is fitted with a deformable toroid sealing means which serves to enclose the substance forming the confectionery shell once the stamp is placed in the mould.

However, producing confectionery shells of a defined thickness by conventional cold-stamping technology requires accurate stamps and moulds. If the stamps and moulds are not accurately dimensioned, the cavity formed between the mould and the stamp is ill-defined and the ensuing confectionery shell can have a less than satisfactory appearance. In some circumstances, which can depend upon product type and intended consumer, confectionery shells produced with an ill-defined cavity can be of unacceptable quality. This limitation means that a mould/stamp combination designed for producing one shell thickness cannot be used to produce another thickness of shell without having a detrimental effect on product quality. Producing a new thickness of confectionery shell therefore requires a new set of well-designed and precision-manufactured moulds and stamps.

The commissioning and manufacture of each set of stamps and moulds is expensive and results in a time delay before a new thickness of confectionery shell can be produced of acceptable quality. Even when the required stamps and moulds are already available, installing these stamps and moulds halts production and is therefore also not cost-effective.

The need for accurate stamps and moulds also has implications when producing multi-layer confectionery shells. This is because each ensuing layer in a multi-layer structure has the effect of increasing the thickness of the overall multi-layer shell. Accurate stamps and moulds are typically needed to produce each new thickness of the overall multi-layer shell.

It is therefore an object of the present invention to overcome these limitations and provide methods for the manufacture of confectionery shells which are less reliant upon accurate, tailor-made stamps and moulds.

SUMMARY OF THE INVENTION

A first embodiment of the present invention concerns a method of producing a multi-layered confectionery shell comprising the steps of:
  (i) depositing a first edible liquid into a mould cavity;
  (ii) pressing the first edible liquid against the wall of the mould cavity using a stamp having a surface temperature below the solidification temperature of the first edible liquid so as to shape and at least partially solidify the first edible liquid in the mould cavity;
  (iii) removing the stamp from the mould cavity;
  (iv) depositing a second edible liquid into the mould cavity; and
  (v) pressing the second edible liquid against the layer formed from the first edible liquid using a stamp having a surface temperature below the solidification temperature of the second edible liquid so as to shape and at least partially solidify the second edible liquid in the mould cavity;
  wherein the distance x the stamp is pressed into the mould cavity in step (v) is shorter than the distance x the stamp is pressed into the mould cavity in step (ii).

This method allows a multi-layer confectionery shell to be produced using just a single stamp. The user therefore requires fewer stamps than conventional processes, which represents a significant cost saving. Furthermore, time delays associated with re-configuring confectionery-producing machinery with new stamps are reduced because moulds and stamps do not need to be replaced to produce each new multi-layer shell. This reduced machinery downtime reduces associated loss in production and therefore represents a further cost benefit.

A second embodiment of the present invention concerns a method of producing a plurality of confectionery shells comprising the steps of:
  (a) depositing a first edible liquid into a mould cavity;

(b) pressing the first edible liquid against the wall of the mould cavity using a stamp having a surface temperature below the solidification temperature of the first edible liquid so as to shape and at least partially solidify the first edible liquid in the mould cavity;

(c) removing the stamp from the mould cavity; and (d) pressing the stamp into another mould cavity in which a second edible liquid has been deposited in order to press the second edible liquid against the wall of the cavity so as to shape and at least partially solidify the second edible liquid, the stamp having a surface temperature below the solidification temperature of the second edible liquid;

wherein the distance x the stamp is pressed into the mould cavity in step (b) is different to the distance x the stamp is pressed into the mould cavity in step (d).

The method of the second embodiment enables the production of a plurality of confectionery shells whilst requiring only one stamp. Moreover, because the distance x in step (b) and (d) is different, the plural confectionery shells can be obtained with different shell thicknesses without having to use multiple stamps. This method therefore represents a significant cost saving to the user. The method also reduces machinery downtime and associated loss of production caused by reconfiguring it with new stamps, which represents a further cost benefit to the user.

In some embodiments, the first and/or second edible liquids of the first and/or second embodiments are sometimes ejected from the mould cavity. In some embodiments, an optional scraping step can be employed in order to remove ejected edible liquid or material formed from ejected edible liquid. This scraping step can be conducted by passing scraping means outwardly over the boundary of the mould cavity in two or more different outward directions.

The optional scraping step can be used to provide confectionery shells with a cleaner edge than is sometimes obtained without the optional scraping step. This can be useful when, for instance, the confectionery shell is intended for a luxury market which would not tolerate a less clean edge. For instance, the optional scraping step is useful when removing ejected edible material which remains contiguous with edible material within the mould cavity, which can otherwise be difficult to remove without damaging the confectionery shell. The clean edge of the confectionery shell is aesthetically pleasing to the consumer and enables filled confections to be formed with a clean bottom.

BRIEF DESCRIPTION OF THE DRAWINGS

FIG. 5: edges of a confectionery shell formed when scraping means is passed outwardly (FIG. 5a) and inwardly (FIG. 5b) over the boundary.

FIG. 6: scraping directions shown on a plan view of a mould cavity.

FIG. 7: a multi-layered confectionery shell in a mould cavity.

DETAILED DESCRIPTION OF THE INVENTION

Figure 1A:
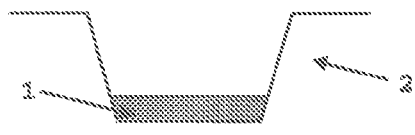
FIG. 1: an edible liquid deposited within a mould cavity (FIG. 1a) wherein the mould cavity can already contain an confectionery shell (FIG. 1b).

The method of the first embodiment concerns the production of a multi-layered confectionery shell. The multi-layered confectionery shell can, for instance, be a shell for a praline, confectionery block or tablet, an individual confectionery item or a confectionery bar (countline).

"Multi-layered" here means two or more layers, adjacent layers differing from one another in some identifiable way. For example, FIG. 7 shows a multi-layered confectionery shell comprising two layers, a layer 6 and a layer 8, formed inside a cavity of a mould 2. Adjacent layers can, for instance, differ in terms of their composition and/or colour. Adjacent layers do not, however, necessarily form a distinct boundary; adjacent layers can sometimes be mixed to a certain extent to form a boundary zone, provided that the layers on either side are distinguishable.

The composition of each layer is not particularly limited, provided that each layer is made from edible material. In some embodiments, the outermost layer can comprise a chocolate composition and at least one other layer is a layer comprising a (moisture) barrier composition. In some embodiments, the outermost layer can be a chocolate layer and the innermost layer can be a moisture barrier layer.

A moisture barrier composition can be used to prevent moisture transfer from the confection to the environment or within the confection into moisture-sensitive components (e.g. chocolate), especially if the shell is to be filled with a component having a high water activity (e.g. a fresh fruit composition). The moisture barrier composition can be any conventional moisture barrier composition such as a fat-based moisture barrier composition or a heterogeneous moisture barrier composition, both of which contain crystalline fats.

"Liquid" in the context of the present invention means flowable, i.e. unsolidified to such an extent that the material flows under the action of gravity or an applied force.

The method of the first embodiment involves the depositing of first and second edible liquids in a mould cavity. Each edible liquid can have a range of viscosities, provided that it is capable of being deposited into the mould cavity using a conventional depositor and is capable of being cold-stamped using a conventional cold-stamping apparatus. Each edible liquid may contain solid components, and therefore includes, for instance, gels, pastes, suspensions and emulsions. Pieces of solidified material present in each edible liquid can have a diameter of ≤80 μm, ≤70 μm, ≤60 μm, ≤50 μm, ≤40 μm or ≤35 μm. Moreover, solid material can be present in an amount of ≤80% ≤75%, ≤70%, ≤60% or ≤50% by mass relative to the total mass of the edible liquid.

In one embodiment, at least one of the edible liquids is liquid chocolate, wherein chocolate includes plain, dark, milk, white and compound chocolate. In some embodiments, each edible liquid is independently liquid chocolate.

Each edible liquid can also be a mixture of two or more edible liquids, provided that the overall mixture is flowable. The mixture can, for instance, be a mixture of two or more of plain, dark, milk, white and compound chocolate in liquid form.

Each edible liquid can be treated prior to deposition to ensure that it has adequate flow properties for deposition and stamping, and to ensure that it has optimal solidification properties. For instance, chocolate can be tempered using a conventional method so that it contains stable crystals. This causes the chocolate to contract slightly upon contact with the stamp, which allows the stamp to be withdrawn without the shell adhering to the stamp.

The mould cavity may be one of a plurality of cavities. For instance, the mould may be a tray mould consisting of one or more lanes of cavities, the cavities also being arranged into rows (e.g. 2-6 rows). The size and shape of the cavity depends on the type of shell to be produced. In some embodiments, the cavity can have a substantially uniform inner surface which corresponds to the shape of the stamp such that a shell having a uniform thickness is produced when the stamp is pressed fully into the mould cavity.

The mould cavity may contain sub-cavities. For instance, the cavity may be for producing confections in tablet form, the tablet having blocks which can be broken into manageable pieces.

The first edible liquid can be deposited into the mould cavity manually or using a conventional depositor such as a multi-nozzle depositor which deposits into multiple cavities simultaneously. In some embodiments, the first edible liquid can be deposited into the mould cavity to form a layer 1 extending around the wall of the cavity and having a substantially even surface (see FIG. 1). This can be achieved by vibrating the mould 2, if necessary. Vibrating can be carried out using conventional apparatus known in the art.

In some embodiments, the mould cavity in which the first edible liquid is deposited already contains one or more confectionery shells. The confectionery material forming the pre-existing confectionery shells is not particularly limited, and can be the same as or different to the first and second edible liquids.

Once the first edible liquid has been deposited into the mould cavity, it is pressed using a stamp. A conventional cold-stamping apparatus may be employed to perform the pressing step. Such an apparatus comprises one or more stamps having a pressing surface. The stamps are usually made from a metal such as aluminium or an alloy such as steel. The apparatus also comprises a means for cooling the stamps. Cooling is typically achieved by circulating a cooling liquid through the apparatus between the stamps, the cooling liquid being at a temperature less than the desired temperature of the pressing surface of the stamp.

The stamp is immersed into the first edible liquid, the immersed surface of the stamp having a temperature which is lower than the solidification temperature of this edible liquid. This ensures that the first edible liquid is at least partially solidified by the stamp. Specifically, the edible liquid in contact with the stamp is solidified to form an inner "skin" which acts to maintain the shape of the shell when the stamp is withdrawn and provide a barrier to material subsequently filled into the shell. It is therefore not essential that the first edible liquid is fully solidified during the pressing step. In this case, the first edible liquid can be further solidified after the pressing step by cooling the entire mould.

The surface temperature of the stamp is dependent upon the solidification temperature of the first edible liquid and the immersion period (the period in which the stamp is in contact with the first edible liquid). In some embodiments, the stamp can have a surface temperature of less than 10° C., 0° C. or less, −5° C. or less, −10° C. or less, −15° C. or less, and can be in the range of −25° C. to 0° C., which helps to reduce the immersion period and produce a more rigid shell.

In some embodiments, the immersion period is less than 10, 9, 8, 7, 6 or 5 seconds, and can be 1-3 seconds.

During the pressing step, the first edible liquid conforms to the shape of the gap defined by the stamp 3 and the wall of the mould cavity (see FIG. 2). This step can be conducted by pressing the stamp fully into the mould cavity (see FIG. 2*a*) or the pressing movement can be halted short of the fully pressed position show in FIG. 2*a* (see FIG. 2*b*). As shown in FIG. 2*a*, pressing the stamp fully into the mould cavity results in the stamp resting against a part of the surface defining the mould or the mould cavity. In the case of FIG. 2*a*, the stamp rests against the surface of the mould just outside the mould cavity.

Figure 2A:
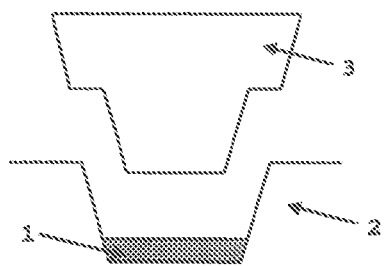
FIG. 2: immersing a stamp into a mould cavity. The stamp in FIG. 2a is immersed until it rests against the surface of the mould and edible liquid ejected from the mould cavity or material formed from ejected edible liquid is physically separated from edible liquid remaining within the mould cavity.
In FIG. 2b at least a part of the edible liquid ejected from the mould cavity or material formed from the ejected edible material is contiguous with edible liquid remaining within the mould cavity.
Figure 2A:
Figure 2A:
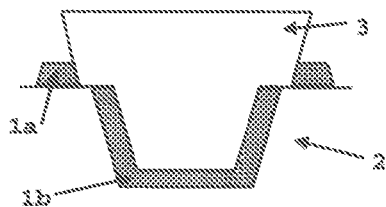

When the stamp 3 is pressed fully into a cavity of the mould 2 (as shown in FIG. 2*a*), no part of the first edible liquid ejected outside the mould cavity or material formed from ejected edible liquid (together referred to as ejected "edible material" 1*a* hereinafter) is contiguous with the first edible liquid 1*b* inside the mould cavity. "Contiguous" here means a direct physical contact between edible material ejected from the mould cavity and edible liquid remaining within the mould cavity. "Material formed from ejected edible liquid" is edible liquid which has changed in some way after having been ejected from the mould cavity and includes, for instance, edible liquid which has at least partially solidified.

Figure 2B:
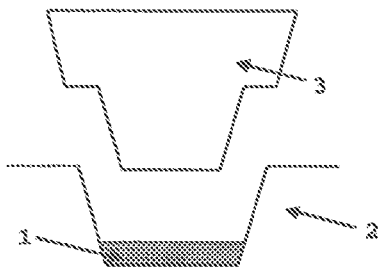
Figure 2B:
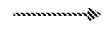
Figure 2B:
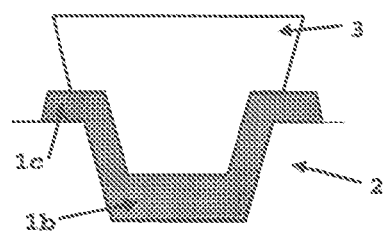
Figure 3A:
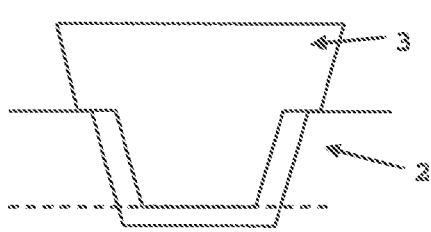
FIG. 3: a stamp halted a distance 'y' (FIG. 3b) short of the position at which it is pressed fully into the mould cavity (FIG. 3a).

In contrast, FIG. 2*b* shows a pressing step in which the pressing motion of the stamp has been halted short of the full pressing position. The ensuing gap between the stamp and the mould allows ejected edible material 1*c* to remain contiguous with the non-ejected edible liquid 1*b*. The "full pressing position" is the position the stamp when it is pressed fully into the mould cavity, as is shown in FIG. 2*a* and FIG. 3*a*.

Figure 3B:
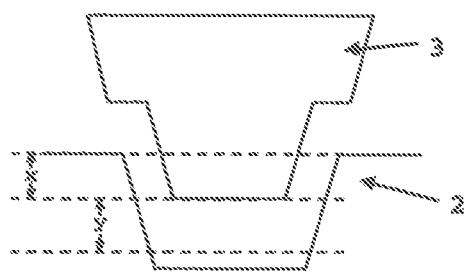

When the pressing motion of the stamp is halted short of the full pressing position, the degree to which the stamp is not fully pressed can be expressed as the distance 'y' short of the full pressing position (see FIG. 3*b*). In the first embodiment, the pressing of the first edible liquid can be conducted by moving the stamp into the full pressing position (y=0) or by halting the stamp short of the full pressing position (y>0). The degree to which a stamp is pressed into a mould cavity can also be expressed as the distance 'x' (see FIG. 3*b*), which is the distance between the lowermost point of the stamp in the mould cavity and the plane which defines the open end of the mould cavity.

Once the stamp has been withdrawn from the mould cavity, the second edible liquid is deposited into the mould cavity. In some embodiments, the second edible liquid can be deposited into the mould cavity to form a layer 7 having a substantially even surface and extending to the wall of the layer 6 formed from the first edible liquid (see FIG. 1*b*).

This can be achieved by vibrating the mould 2, if necessary. Vibrating can be carried out using conventional apparatus and techniques as known in the art.

There is no particular limitation on the time interval between withdrawing the stamp after pressing the first edible liquid and the depositing of the second edible liquid into the mould cavity. In some embodiments, the time interval is long enough for the layer formed from the first edible liquid to solidify to the extent that substantially no mixed boundary zone exists between the layers formed from the first and second edible liquids. In some embodiments, the mould is cooled following the pressing of the first edible liquid in order to promote its further solidification. In some embodiments, the time interval is short enough to increase the amount of mixing between the layers in the boundary zone.

Once the second edible liquid is deposited in the mould cavity, it is pressed with the stamp against the layer formed from the first edible liquid. The edible liquid therefore forms a shape corresponding to the gap formed between the stamp and the layer formed from the first edible liquid. In some embodiments, depending upon the relative shape of the mould and the stamp, it is possible that different regions of the second edible liquid are pressed against the layer formed from the first edible liquid or the wall of the mould cavity. This can sometimes occur if the layer formed from the first edible liquid does not completely coat the wall forming the mould cavity.

The second liquid is pressed in the same manner as the first edible liquid, except that the stamp is halted short of the final pressing position attained during the pressing of the first edible liquid. That is, the distance y in this pressing step is larger than that for the pressing of the first edible liquid. In other words, the distance x is shorter when pressing the second edible liquid when compared with the pressing of the first edible liquid.

In some embodiments, the multi-layered confectionery shell is further cooled after the pressing of the second edible liquid in order to further solidify the multi-layer shell.

In some embodiments, the open end of the multi-layered confectionery is scraped after the stamp has been removed following the pressing of the second edible liquid. The optional scraping step can be used to improve the appearance of the open end of the shell. In some embodiments, the scraping step is used to remove ejected edible material. The optional scraping step will be described in greater detail below.

The shell may be de-moulded following pressing, optional cooling and optional scraping. On the other hand, further steps may be performed before de-moulding. For instance, a further layer may be formed inside the confectionery shell just formed. Such a further layer can be a moisture barrier. In addition, the shell may be filled with, for example, a filling material such as chocolate, cream, caramel, toffee, ganache, emulsion, truffle, alcohol, fruit and combinations thereof. A finishing layer may be formed on the filling to fully enclose it.

In some embodiments, two confectionery shells can be joined at the open ends to provide a continuous confectionery casing. Filling the two confectionery shells prior to joining their open ends provides an encapsulated confectionery product. In instances where the open end of a confectionery shell is less visible (e.g. when two shells are joined by their open ends), scraping the shells to provide a smooth edge is sometimes less crucial.

The second embodiment of the present invention concerns a method of producing a plurality of confectionery shells which requires only a single stamp.

The method of the second embodiment involves the depositing of first and second edible liquids into separate mould cavities. In some embodiments, the first and second edible liquids used in the method of the second embodiment are those as described above for the first embodiment. Moreover, in the second embodiment, the first and second edible liquids can be the same or different.

In some embodiments, the mould cavities in which the first and second edible liquids of the second embodiment are deposited have the same shape and their corresponding dimensions differ by less than 5%, less than 3% or less than 1%. Here, "shape" means the overall geometric outline and surface of the mould cavity but without reference to its absolute size of dimensions. In some embodiments, the mould cavities are as described above for the first embodiment.

The mould cavities used in the method of the second embodiment can be located in the same mould of in different moulds. In some embodiments, the moulds used in the second embodiment are as described above for the first embodiment.

The method by which the first and second edible liquids of the second embodiment are deposited in the mould cavities is not particularly limited. In some embodiments, the first and second edible liquids are deposited as described above for the first embodiment.

The first and second edible liquids can be placed into their respective mould cavities in either order. That is to say, the first edible liquid can be deposited into its mould cavity before or after the second edible liquid is deposited into its mould cavity.

Figure 1B:
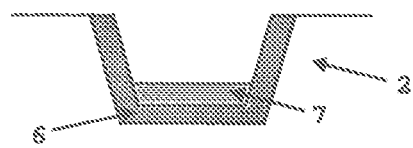

In some embodiments, the first and second edible liquids are deposited in their respective mould cavities so as to form a layer 1 extending around the wall of the cavity and having a substantially even surface (see FIG. 1). This is sometimes achieved by vibrating the mould as described in the first embodiment.

Once the first and second edible liquids are deposited in their respective mould cavities, they are pressed using a stamp. In some embodiments, stamps used for pressing in the second embodiment are the same as described above for the first embodiment.

The individual pressings of the first and second edible liquids of the second embodiment are conducted as described above for the pressing of the first edible liquid in the first embodiment. However, the distance the stamp is pressed into the mould cavity is different in the pressing of the first edible liquid and the pressing of the second edible liquid. In other words, the distance x in FIG. 3b is different for the pressing of the first and second edible liquids in the second embodiment.

In some embodiments, the distance y for the pressing of the first edible liquid is longer than the distance y for the pressing of the second edible liquid. In other embodiments, the distance y for the pressing of the first edible liquid is shorter than the distance y for the pressing of the second edible liquid. In some embodiments, the first edible liquid can be pressed by pressing the stamp fully into the mould cavity (FIG. 3a, y=0). In some embodiments, the second edible liquid can be pressed by pressing the stamp fully into the mould cavity (FIG. 3a, y=0).

Correspondingly, in some embodiments, the distance x in the pressing of the first edible liquid is shorter than during the pressing of the second edible liquid. In some embodiments, the distance x in the pressing of the first edible liquid is longer than during the pressing of the second edible liquid.

The thickness of the plural confectionery shells produced by the method of the second embodiment is influenced by the distance the stamp is pressed into the mould cavity in each pressing step. Because the distance the stamp is pressed into mould cavities is different when pressing the first and second edible liquids, the thickness of the confectionery shells formed from these edible liquids is accordingly different. In some embodiments, the difference in the distance x during the pressing steps manifests itself as a difference in confectionery shell thickness of x.

Moreover, halting the pressing movement a distance y short of the full pressing position produces a confectionery shell in which generally the thickness of the confectionery shell wall itself increases away from the open end of the shell. That is, shell thickness is generally increased to a lesser extent in regions of the shell closer to its open end. A confectionery shell in which the thickness of the wall itself varies provides the benefits of a more voluminous confectionery shell without having to increase shell thickness throughout its entirety. For instance, relatively large inclusions can be accommodated in the thicker regions of the confectionery shell without unduly increasing the shell thickness throughout the whole shell.

In some embodiments, the open ends of the plural confectionery shells are scraped after the stamp has been removed following the pressing of the edible liquid. The optional scraping step can be used to improve the appearance of the open end of the shells. In some embodiments, the scraping step is used to remove ejected edible material. The optional scraping step will be described in greater detail below.

The shells may be de-moulded following pressing, optional cooling and optional scraping. On the other hand, further steps may be performed before de-moulding, before optional cooling or before optional scraping. In some embodiments, the further processing steps are as described above the first embodiment.

Once the stamp has been withdrawn from a mould cavity in either the first or the second embodiment, edible material ejected from the mould cavity is, in some embodiments, removed by scraping. In some embodiments, the edible liquid is not made brittle prior to the optional scraping step. Instead, the scraping step is sometimes performed when the edible liquid is in a leathery, or ductile, state. This reduces the risk of shell fracture during the scraping step.

Figure 4A:
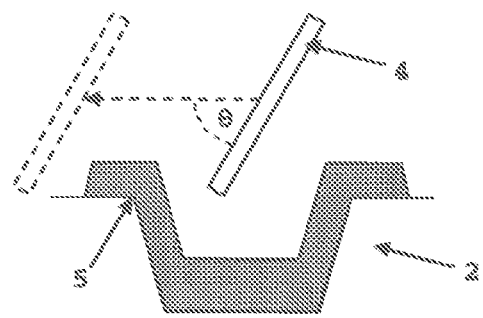
FIG. 4: removing edible liquid ejected from the mould cavity or material formed from the ejected edible liquid by moving scraping means outwardly (FIG. 4a) and inwardly (FIG. 4b) over the boundary of the mould cavity.

In some embodiments, the optional scraping is conducted by passing scraping means 4 outwardly over the boundary 5 of the mould cavity in two or more different outward directions (see FIG. 4a). The scraping means passed in each outward direction can be the same or different, and in some embodiments each scraping means is suitably a knife, which can be made of plastic, ceramic, metal and/or alloy. For instance, one or more scraping means can be a metallic knife. The temperature of each scraping means can be ambient temperature. The boundary 5 of the mould cavity is the border where the surface of the mould not forming the mould cavity meets the surface of the mould forming the mould cavity; it therefore has a mould cavity side and a non-mould cavity side.

Figure 4B:
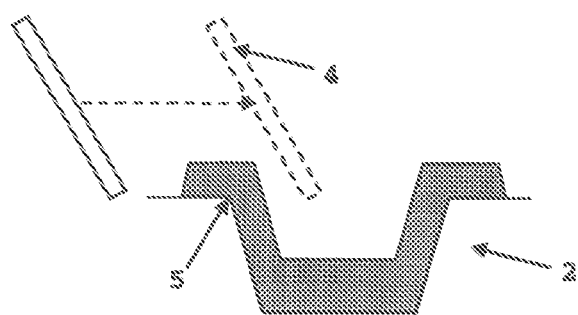

"Outward" direction means from the mould cavity side of the boundary 5 to the non-mould cavity side. Thus, the outward direction is opposite to the "inward" direction shown in FIG. 4b, wherein the scraping means is moving from the non-mould cavity side of the boundary 5 to the mould cavity side.

In some embodiments, each outward direction of the scraping means is substantially in the plane of the mould surface on the non-mould cavity side of the boundary 5. Here substantially in the plane means that the angle formed between the outward direction of the scraping means and the plane of the mould surface on the non-mould cavity side of the boundary 5 is 45° or less.

In some embodiments, each outward direction of the scraping means generally avoids crossing the boundary 5 of the mould cavity in an inward direction. Minor inward crossing of the mould boundary is tolerated where, for instance, the shape of the boundary makes crossing the boundary inwardly necessary from a practical point of view. This could be where, for example, the shape of the boundary of the mould cavity is particularly elaborate.

In one embodiment, at least two of the outward directions are substantially opposite. That is to say, at least two outward directions form an angle of 180±5° (as shown in FIGS. 6b and 6c). Scraping means can be passed over the boundary 5 of the mould cavity in two to four or four or more different outward directions. In some embodiments, scraping means are passed over the boundary 5 of the mould cavity in four different outward directions. In one embodiment where scraping means are passed over the boundary 5 of the mould cavity in four or more different directions, at least two pairs of outward directions can be substantially opposite. That is to say, at least two pairs of outward directions form and angle within each pair of 180±5° (shown as separate pairs of directions in FIG. 6b and FIG. 6c).

The outward direction of the scraping means causes at least a part of the scraping means to begin the scraping motion on the mould cavity side of the boundary 5. The relative dimensions of the boundary 5 and the scraping means 4 may mean that parts of the scraping means begin the scraping motion on the side of the boundary 5 opposite to the mould cavity, but this can be tolerated provided that the scraping means passes over the boundary 5 in an overall outwardly direction.

By passing the scraping means over the boundary 5 in an outward direction, ejected edible material is removed whilst providing the confectionery shell with an edge substantially free of defects (see FIG. 5a). In particular, ejected edible material remaining contiguous with edible liquid inside the mould cavity is removed whilst avoiding defects on the edge of the confectionery shell. In some embodiments, this scraping motion can cause the wall forming the confectionery shell itself to taper towards the newly-formed edge. This can be caused by edible liquid forming the confectionery shell adhering to the scraping means to some extent such that is dragged away by the movement of the scraping means. This tapered edge is beneficial if and when a finishing layer is formed across the open end of the confectionery shell (i.e. bottoming the shell) because a clean edge is formed.

In contrast, passing the scraping means over the boundary 5 in an inward direction causes defects along the edge of the confectionery shell. FIG. 5b illustrates two types of such defects. In the first illustration, the scraping means has caused a lip to form at the edge of the confectionery shell. In the second illustration, the scraping means has caused part of the confectionery shell to be detached from the wall of the mould cavity. Both of these types of defects make the confectionery shell less appealing to the consumer and inhibit the formation of a clean edge when a finishing layer is formed across the open end of the confectionery shell.

The scraping means 4 forms an applied scraping angle θ with the scraping direction (see FIG. 4a). The applied scraping angle in some embodiments can be 20° or more and in some embodiments can be 45° or less. The applied scraping angle in some embodiments is in the range of from 20° to 45°. When the scraping angle is 20° or more, the edible material ejected from the mould cavity which is contiguous with the edible liquid in the mould cavity is more efficiently separated from the edible liquid within the mould. This is thought to be because the scraping means is more likely to penetrate into the ejected material than ride over its surface. When the scraping angle is more that 45°, removal of ejected material is less effective. This is thought to be because the scraping means tends to bend and enter the mould cavity.

Prior to the scraping process, the mould can, in some embodiments, be orientated so that edible material removed by scraping falls away from the mould under gravity. This helps to prevent removed edible material from collecting in the mould cavities. If edible liquid within mould cavities orientated in this way is already solidified to the extent that is does not flow or deform within the mould cavity, then it is less likely to deform during this step. The open end of the mould cavities can sometimes face downwards during the scraping process in order to minimise the amount of removed edible material collecting in the mould cavities.

The shell may be de-moulded following pressing, optional cooling and optional scraping. On the other hand, further steps may be performed before de-moulding. For instance, a further layer may be formed inside the confectionery shell just formed. Such a further layer can be a moisture barrier.

In addition, the shell may be filled with, for example, a filling material such as chocolate, cream, caramel, toffee, ganache, emulsion, truffle, alcohol, fruit and combinations thereof. A finishing layer may be formed on the filling to fully enclose it.

In some embodiments of the invention, confectionery shells are produced comprising one or more inclusions. In the context of this application, an "inclusion" is a piece of edible material having a different composition to that of the edible liquid forming the confectionery shell, or layer thereof, in which the inclusion is accommodated. An inclusion is suitably a solid component, examples of which are pieces of caramel, toffee, chocolate, fruit, nut, candy etc. In some embodiments, the smallest dimension of each inclusion is at least 0.1 mm.

There is no particular limitation on which confectionery shell in which embodiment contains one or more inclusions. For instance, in the first embodiment, the layer formed from the first edible liquid can comprise one or more inclusions and the layer formed from the second edible liquid can comprise no inclusions; the layer formed from the first edible liquid can comprise no inclusions and the layer formed second edible liquid can comprise one or more inclusions; neither the layer formed from the first nor the second edible liquid comprises inclusions; or the layers formed from the first and second edible liquids can both independently comprise one or more inclusions.

In the second embodiment, the shell formed from the first edible liquid can comprise one or more inclusions and the shell formed from the second edible liquid can comprise no inclusions; the shell formed from the first edible liquid can comprise no inclusions and the shell formed from the second edible liquid can comprise one or more inclusions; neither the shell formed from the first edible liquid nor the second edible liquid comprises inclusions; or the shells formed from the first and second edible liquids can both independently comprise one or more inclusions.

Where a confectionery shell or layer is formed comprising one or more inclusions, the pressing step is performed when the mould cavity contains edible liquid and one or more inclusions. The mass of inclusion(s) present with the edible liquid to be pressed is not particularly limited, but can be ≤50% by mass or ≤30% by mass relative to the mass of edible liquid deposited in the mould cavity More than one type of inclusion can be present with the edible liquid in the mould cavity. Where more than one type of inclusion is present, the total amount of inclusions can be the same as mentioned above for one type of inclusion.

The size of inclusions is not particularly limited, provided that they can be accommodated within a confectionery shell without protruding outside the shell. In the case of a multi-layer shell, the inclusion can sometimes protrude into neighbouring layers but not beyond the surface of the overall shell. Protrusion beyond the surface of the overall shell in any confectionery shell could result in damage to the inclusion during subsequent processing steps and a corresponding loss of product quality. Accommodation within the confectionery shells can be achieved by ensuring that at least one of the dimensions of each inclusion is less than or equal to the thickness of the region of the confectionery shell in which it is accommodated.

The process by which inclusions and the edible liquid become coexistent in the mould cavity is not particularly limited. The inclusions and the edible liquid can be combined before being deposited into the mould cavity or can be combined only once inside the mould cavity. Where the inclusions and the edible liquid are combined only once inside the mould cavity, the inclusions can be deposited in the mould cavity before or after the edible liquid is deposited.

Because the methods of the present invention enable the production of confectionery shells of different thicknesses, the method can be used to produce confectionery shells accommodating inclusions of varying sizes. As mentioned above, this product variation is achieved without replacing the stamps and moulds and without compromising product quality. This means that confectionery shells can be produced accommodating different sized inclusions without the need for expensive new stamps and moulds and without halting production during which fresh stamps and moulds are fitted.

Changing the thickness of the confectionery shell also enables the user to vary the extent to which the inclusions are visible to the consumer. Specifically, conducting the pressing step to produce a thicker shell will cause the inclusions to be less visible to the consumer, whereas a thinner shell will cause the inclusions to be more visible to the consumer. Whilst inclusions can be made more visible, in some embodiments the inclusions do not protrude beyond the surface of the confectionery shell because the protruding inclusion is susceptible to damage during subsequent processing steps. As mentioned above, the shell thickness can be changed without compromising on product quality, and in particular the edge of the confectionery shell is substantially free of defects.

Moreover, and as mentioned above, the method of the present invention can be used to make confectionery shells in which the thickness of the shell itself varies. If the stamp is not pressed fully into the mould, the thickness of the ensuing confectionery shell will generally be greater in regions further from the open end of the shell. Relatively large inclusions can therefore be accommodated in the thicker regions of the confectionery shell without unduly increasing the thickness of the entire shell.

The present invention is further illustrated by way of the following Examples, which should not be construed as limiting the present invention in any way.

EXAMPLES

Example 1

Tempered Milka® chocolate mass (55 g, manufactured by Kraft Foods) was manually deposited at 30° C. into a cavity of a stamp mould (Brunner-Glonn, Germany), the mould having been stored in a heating cabinet for 2 days at 30° C.

The mould was vibrated for 30 seconds to even the surface of the chocolate mass inside the mould cavity.

The chocolate mass was then pressed in the mould cavity using a Knobel® Cold Stamp Unit (CP Standard Cold Press Type 07-KCM-09, Knobel, Felben CH). The immersion period was set to 7 seconds, the surface of the stamp was −5° C. and the speed was 60 mm s$^{-1}$. The stamp was pressed into the cavity to its fullest extent (i.e. the position of the stamp corresponded to y=0 mm in FIG. 3b).

The stamp was withdrawn and the mould was stored at ambient temperature for 5 minutes. Next, tempered Milka® white chocolate mass (45 g) was manually deposited into the mould cavity at 30° C. The white chocolate mass was then pressed in the mould cavity using the same stamp and stamping conditions as before, except that the pressing motion of the stamp was halted 1 mm short of the fully pressed position (i.e. the position of the stamp corresponded to y=1 mm in FIG. 3b). In other words, the distance x in FIG. 3b used to press the white chocolate mass was 1 mm shorter than the distance z used to press the milk chocolate mass.

The stamp was then removed and the mould was cooled to a temperature of 10° C. over a period of 15 min. The multi-layer chocolate shell was then manually removed from the mould ready for inspection. This inspection revealed that the multi-layer shell comprised an outer milk chocolate layer and an inner white chocolate layer. The outer, milk chocolate layer had a thickness of 1.1 mm in the region of the shell furthest from the open end of the shell. The inner, white chocolate layer had a thickness of 1.0 mm in the same region.

Example 2

Example 2 was conducted in the same manner as Example 1 except that a scraping step was performed prior to removing the confectionery shell from the mould in order to remove edible material ejected from the mould cavity in the pressing steps. Scraping was conducted in two scraping actions using a metallic knife as the scraping means and the scraping was conducted at ambient temperature and an applied scraping angle of 45°. One scraping action was made from the middle of the mould cavity along the long sides and outwards over one of the short sides (i.e. motion 'b' in FIG. 6b) and one scraping action from the middle of the mould cavity along the long sides and outwards over the other short side (i.e. motion 'c' in FIG. 6b).

Following removal from the mould cavity, visual inspection of the confectionery shell revealed a similar structure to that obtained in Example 1, except that the open end of the confectionery shell had a smoother edge on account of excess material being removed by scraping. In particular, the edge along the short sides was totally free of defects and only minor slide-type defects were noticeable along the long sides.

Example 3

Example 3 was conducted in the same manner as Example 2, except that the scraping step comprised four scraping actions. The four scraping actions were made from the middle of the mould cavity outwardly across each of the four sides of the mould cavity (i.e. motions 'b' and 'c' in FIG. 6b and motions 'd' and 'e' in FIG. 6c).

Following removal from the mould cavity, visual inspection of the confectionery shell revealed a similar structure to that obtained in Example 1 and Example 2, except that the open end of the confectionery shell had a yet smoother edge on account of excess material being removed by scraping. In particular, the edge along all sides of the confectionery shell was free of defects.

Example 4

Tempered Milka® chocolate mass (2×50 g, manufactured by Kraft Foods) was manually deposited at 30° C. into first and second cavities of a stamp mould (Brunner-Glonn, Germany), the mould having been stored in a heating cabinet for 2 days at 30° C. The mould was vibrated for 30 seconds to even the surface of the chocolate mass inside the mould cavities.

The chocolate mass in the first mould cavity was then pressed using a Knobel® Cold Stamp Unit (CP Standard Cold Press Type 07-KCM-09, Knobel, Felben CH). The immersion period was set to 7 seconds, the surface of the stamp was −5° C. and the speed was 60 mm s$^{-1}$. The stamp was pressed into the cavity to its fullest extent (i.e. the position of the stamp corresponded to y=0 mm in FIG. 3b).

The stamp was withdrawn from the first mould cavity and then aligned with the second mould cavity. The chocolate mass in the second mould cavity was then pressed using the same pressing conditions except that the stamp was halted 1 mm short of the fully pressed position (i.e. the position of the stamp corresponded to y=1 mm in FIG. 3b). In other words, the distance x in FIG. 3b used to press the chocolate mass in the second mould cavity was 1 mm shorter than the distance x used to press the chocolate mass in the first mould cavity.

The stamp was then removed and the mould was cooled to a temperature of 10° C. over a period of 15 min. The chocolate shells were then manually removed from the mould ready for inspection.

This inspection revealed that the chocolate shell produced in the first mould cavity had a thickness of 1.1 mm in the region of the shell furthest from the open end of the shell. The chocolate shell produced in the second mould cavity had a thickness of 2.1 mm in the same region.

Example 5

Example 5 was conducted in the same manner as Example 4 except that a scraping step was performed prior to removing the confectionery shells from the mould in order to remove edible material ejected from the mould cavities in the pressing steps. Scraping of each mould cavity was conducted using two scraping actions wherein the scraping means used was a metallic knife at ambient temperature and an applied scraping angle of 45°. One scraping action was made from the middle of each mould cavity along the long sides and outwards over one of the short sides (i.e. motion 'b' in FIG. 6b) and one scraping action from the middle of each mould cavity along the long sides and outwards over the other short side (i.e. motion 'c' in FIG. 6b).

Following removal from the mould cavity, visual inspection of the confectionery shells revealed similar structures to those obtained in Example 4, except that the open end of the confectionery shells had a smoother edge on account of excess material being removed by scraping. In particular, the edge along the short sides was totally free of defects and only minor slide-type defects were noticeable along the long sides. The smoother edge was particularly noticeable for the confectionery shell produced in the second mould cavity, in which the stamp has been pressed to a lesser extent.

Example 6

Example 6 was conducted in the same manner as Example 5, except that the scraping step comprised four scraping actions over each mould cavity. The four scraping actions were made from the middle of each mould cavity outwardly across each of the four sides of each mould cavity (i.e. motions 'b' and 'c' in FIG. 6b and motions 'd' and 'e' in FIG. 6c).

Following removal from the mould cavity, visual inspection of the confectionery shells revealed a similar structure to that obtained in Example 4, except that the open end of the confectionery shells had a smoother edge on account of excess material being removed by scraping. In particular, the edge along all sides of the confectionery shells was free of defects. The smoother edge was particularly noticeable for the confectionery shell produced in the second mould cavity, in which the stamp has been pressed to a lesser extent.

The invention claimed is:

1. A method of producing a multi-layered confectionery shell comprising the steps of:
   (i) depositing a first edible liquid into a mould cavity;
   (ii) pressing the first edible liquid against a wall of the mould cavity using a stamp having a surface temperature below a solidification temperature of the first edible liquid so as to shape and at least partially solidify the first edible liquid in the mould cavity;
   (iii) removing the stamp from the mould cavity;
   (iv) depositing a second edible liquid into the mould cavity; and
   (v) pressing the second edible liquid against the layer formed from the first edible liquid using the stamp having a surface temperature below a solidification temperature of the second edible liquid so as to shape and at least partially solidify the second edible liquid in the mould cavity,
   wherein, in step (ii) the stamp is pressed a first distance into the mould cavity and in step (v) pressing of the stamp is halted short of the first distance so that at least some of the second edible liquid is ejected from the mould cavity while remaining contiguous with the edible liquid remaining within the mould cavity, and wherein the stamp used in step (ii) is the same stamp used in step (v).

2. The method according to claim 1, wherein the first and second edible liquids have different compositions.

3. The method according to claim 2, wherein at least one of the first and second edible liquids comprises chocolate.

4. The method according to claim 1, wherein the method further includes a step (vi) of removing at least one of the first and second edible liquids which has been ejected from the mould cavity or material formed from ejected edible liquid by passing a scraping device outwardly over the boundary of the mould cavity in two or more different outward directions.

5. The method according to claim 4, wherein step (vi) comprises passing the scraping device outwardly over the boundary of the mould cavity in four different outward directions.

6. The method according to claim 4, wherein an applied scraping angle θ of the scraping device in step (vi) relative to the direction of scraping is at least one of 20° or more and 45° or less.

7. The method according to claim 1, wherein at least one of the first edible liquid in step (ii) and the second edible liquid in step (v) is mixed with one or more pieces of solidified edible material prior to pressing with the stamp, each piece of solidified edible material having a different composition to that of the edible liquid being shaped and at least partially solidified in that step.

8. A confectionery shell obtained by the method according to claim 1.

9. A method of producing a plurality of confectionery shells having different thicknesses, the method comprising the steps of:
   (a) depositing a first edible liquid into a first mould cavity;
   (b) pressing the first edible liquid against a wall of the first mould cavity using a stamp having a surface temperature below a solidification temperature of the first edible liquid so as to shape and at least partially solidify the first edible liquid in the first mould cavity;
   (c) removing the stamp from the first mould cavity; and
   (d) after removing the stamp from the first mould cavity, pressing the stamp into a second mould cavity in which a second edible liquid has been deposited in order to press the second edible liquid against the wall of the second mould cavity so as to shape and at least partially solidify the second edible liquid in the second mould cavity, the stamp having a surface temperature below a solidification temperature of the second edible liquid;
   wherein, in step (b), the stamp is pressed a first distance into the first mould cavity to form a first shell having a first thickness, and in step (d), the pressing of the stamp is halted short of the first distance to form a second shell having a different thickness from that of the first shell.

10. The method according to claim 9, wherein the mould cavities have substantially the same shape and their corresponding dimensions differ by less than 5%.

11. The method according to claim 9, wherein the first and second edible liquids have different compositions.

12. The method according to claim 9, wherein at least one of the first and second edible liquids comprises chocolate.

13. The method according to claim 9, wherein at least one of the first edible liquid in step (b) and the second edible liquid in step (d) is mixed with one or more pieces of solidified edible material prior to pressing with the stamp, each piece of solidified edible material having a different composition to that of the edible liquid being shaped and at least partially solidified in that step.

14. The method according to claim 9, wherein the method further includes a step (e) of removing at least one of the first and second edible liquids which has been ejected from its respective mould cavity or material formed from ejected edible liquid by passing a scraping device outwardly over the boundary of the respective mould cavity in two or more different outward directions.

15. The method according to claim 14, wherein step (e) comprises passing the scraping device outwardly over the boundary of the mould cavity in four different outward directions.

16. The method according to claim 14, wherein an applied scraping angle θ of the scraping device in step (e) relative to the direction of scraping is at least one of 20° or more and 45° or less.

17. A confectionery shell obtained by the method according to claim 14.

18. A confection comprising the confectionery shell according to claim 17.

* * * * *